US010742603B2

(12) United States Patent
Guri et al.

(10) Patent No.: US 10,742,603 B2
(45) Date of Patent: Aug. 11, 2020

(54) SYSTEM AND METHOD FOR MONITORING AND PROTECTING AN UNTRUSTED OPERATING SYSTEM BY MEANS OF A TRUSTED OPERATING SYSTEM

(71) Applicant: B. G. NEGEV TECHNOLOGIES AND APPLICATIONS LTD., AT BEN-GURION UNIVERSITY, Beer Sheva (IL)

(72) Inventors: Mordechai Guri, Modi'in (IL); Yuval Elovici, D.N. Lachish (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 54 days.

(21) Appl. No.: 15/755,073

(22) PCT Filed: Aug. 17, 2016

(86) PCT No.: PCT/IL2016/050899
§ 371 (c)(1),
(2) Date: Feb. 24, 2018

(87) PCT Pub. No.: WO2017/033180
PCT Pub. Date: Mar. 2, 2017

(65) Prior Publication Data
US 2018/0248847 A1     Aug. 30, 2018

Related U.S. Application Data

(60) Provisional application No. 62/300,840, filed on Feb. 28, 2016, provisional application No. 62/241,799, (Continued)

(51) Int. Cl.
G06F 21/00     (2013.01)
H04L 29/06     (2006.01)
(Continued)

(52) U.S. Cl.
CPC ...... H04L 63/0236 (2013.01); G06F 9/45558 (2013.01); G06F 21/52 (2013.01);
(Continued)

(58) Field of Classification Search
CPC .................................................. H04L 63/0236
See application file for complete search history.

(56) References Cited

U.S. PATENT DOCUMENTS 8,656,482 B1*  2/2014  Tosa ....................... H04L 63/08
                                                         713/153
2006/0107329 A1  5/2006  Frank et al.
(Continued)

FOREIGN PATENT DOCUMENTS

EP    2680180 A1    1/2014
WO    2015063405 A1  5/2015

OTHER PUBLICATIONS

Supplementary European Search Report for European Patent Application No. 16838671 dated Jan. 31, 2019.
(Continued)

Primary Examiner — Josnel Jeudy
(74) Attorney, Agent, or Firm — FisherBroyles, LLP; Robert Kinberg (57) ABSTRACT

The invention relates to a TEE (Trusted Environment Execution) structure which comprises: (a) a main domain defining a domain of operation for a main OS; (b) a privileged trusted domain defining a domain of operation for a trusted domain OS; and (c) a low level hypervisor which is separated from both of said main OS and said trusted domain OS, said hypervisor is used for: (c. 1) receiving packets from a network; (c.2) examining an address included in each of said received packets; and (c.3) based on the determined address in each of said packets, targeting respectively the packet to either said main OS or to said trusted domain OS, while in the latter case any interaction between the received packet and said main OS is eliminated.

11 Claims, 4 Drawing Sheets

Related U.S. Application Data filed on Oct. 15, 2015, provisional application No. 62/209,910, filed on Aug. 26, 2015, provisional application No. 62/209,920, filed on Aug. 26, 2015.

(51) Int. Cl.
*G06F 21/57* (2013.01)
*G06F 21/53* (2013.01)
*G06F 21/74* (2013.01)
*G06F 21/52* (2013.01)
*G06F 9/455* (2018.01)

(52) U.S. Cl.
CPC .............. *G06F 21/53* (2013.01); *G06F 21/57* (2013.01); *G06F 21/74* (2013.01); *G06F 2009/45587* (2013.01); *G06F 2009/45595* (2013.01)

(56) References Cited

U.S. PATENT DOCUMENTS

| | | | |
|---|---|---|---|
| 2006/0182141 A1* | 8/2006 | Duggirala | H04L 29/06 370/465 |
| 2007/0208873 A1 | 9/2007 | Lu et al. | |
| 2010/0031325 A1 | 2/2010 | Maigne et al. | |
| 2014/0059680 A1 | 2/2014 | Kurien et al. | |
| 2014/0314091 A1* | 10/2014 | Vincent | H04L 12/4633 370/392 |
| 2016/0335433 A1 | 11/2016 | Dabosville et al. | |

OTHER PUBLICATIONS

International Search Report for PCT/IL2016/050899, dated Nov. 21, 2016.
Written Opinion for PCT/IL2016/050899, dated Nov. 21, 2016.

\* cited by examiner

SYSTEM AND METHOD FOR MONITORING AND PROTECTING AN UNTRUSTED OPERATING SYSTEM BY MEANS OF A TRUSTED OPERATING SYSTEM

FIELD OF INVENTION

The invention relates in general to the field of cyber-security. More specifically, the invention relates to an improved structure for protecting an untrusted operating system by using an extensible operating system which operates within a trusted zone, thereby to provide better security and novel maintenance options compared to the prior art.

BACKGROUND OF THE INVENTION

Trusted Execution Environments (TEEs) are commonly used as a "safe container" for executing processes or services in a trusted manner. Examples of TEE implementations are the ARM TrustZone, and Intel TEE. The common TEE architecture combines the main operating system (OS) running on the main processor(s) and having its own "main domain" (also referred herein as the "normal domain"), and a single process or a set of processes that run within another, more privileged and trusted section of the processor, which is commonly referred to as a "trusted domain" or "secured domain". Typically, a "Trusted Domain OS", which is separate, and most often also different in structure, language and layer from the main OS, operates within said privileged secured domain. The access to the Trusted Domain OS can be performed (in a privileged manner) only via the main OS, both for the purpose of its configuration, and for the purpose of receiving service from it in run time.

In one example, the trusted zone is typically used to store encryption and decryption keys. The main OS, in turn, submits data to the trusted-domain OS, which in turn uses a respective process running within the trusted domain to encrypt or decrypt said data, respectively, and return the results to the main OS.

The TEE structure is not so commonly used in embedded systems, and moreover, when used, it is commonly applied for performing limited and specific functionalities.

As described, a user or a process may receive service from the trusted domain only via the main OS. However, the main OS is typically accessible to a wide range of users, devices, and processes, particularly when the system includes a network. Although the ability to access and receive services from the trusted domain is limited and privileged, still the main OS itself is susceptible to malicious code manipulations, in view of its availability to such a wide range of users and processes. Therefore, even though the trusted domain is relatively secured in itself, the fact that the interaction with the trusted domain is implemented via the relatively susceptible environment of the main OS, significantly degrades the security of operation with the trusted domain and its resources.

In another aspect, a hypervisor is commonly used in computer systems as a privileged, low level layer below the operating system. The hypervisor, also called a "virtual machine manager", or a "virtual machine monitor", is a piece of low level software, firmware or hardware. In one example, the hypervisor is commonly used to create and run virtual machines, allowing multiple operating systems to share a single hardware host. Each operating system appears to have the host's processor, memory, and other resources all to itself. In such a manner and structure, a plurality of "virtual machines" is implemented on a single hardware machine.

Even though the TEE and the hypervisor are sometimes implemented on a same machine, their typical functions are totally isolated, namely, one allows receiving services from a trusted-privileged zone, and the other virtually provides the possibility for a plurality of virtual machines to operate on a single machine.

In still another aspect, many systems are required to be turned off relatively frequently to allow performance of maintenance or software updates. However, the turning off becomes almost impossible in essential systems like embedded systems that handle very sensitive processes. The fact that such systems can only rarely be turned off (for example, for maintenance and software upgrade purposes), leads to a situation where the security and performance of the system are compromised.

Moreover, the inspection and analysis with respect to the integrity of the main OS during runtime, even when they are performed by services of the trusted domain OS, are also compromised, as the interaction with said services of the trusted domain OS must be performed via the relatively unsecured environment (i.e., domain) of the main OS.

It is an object of the present invention to provide a structure which significantly improves the security of interaction with the trusted domain of a TEE structure, and with the resources running therewith.

It is still another object of the present invention to provide a structure that enables performance of a secured maintenance and software updates during runtime, particularly in embedded systems.

Other objects and advantages of the invention will become apparent as the description proceeds.

SUMMARY OF THE INVENTION

The invention relates to a TEE (Trusted Environment Execution) structure which comprises: (a) a main domain defining a domain of operation for a main OS; (b) a privileged trusted domain defining a domain of operation for a trusted domain OS; and (c) a low level hypervisor which is separated from both of said main OS and said trusted domain OS, said hypervisor is used for: (c.1) receiving packets from a network; (c.2) examining an address included in each of said received packets; and (c.3) based on the determined address in each of said packets, targeting respectively the packet to either said main OS or to said trusted domain OS, while in the latter case any interaction between the received packet and said main OS is eliminated.

In an embodiment of the invention, said received packets that are targeted to the trusted domain OS convey information to one or more services running by said trusted domain OS at said trusted domain, and wherein results obtained by said running services are conveyed in a packet form back to the hypervisor, which respectively routes the packet to a target entity at the network, without any interaction with said main OS.

In an embodiment of the invention, said examination by the hypervisor of the packet address is performed on a MAC address within said packet.

In an embodiment of the invention, said one or more services of the trusted domain OS analyze data relating to the main OS in a non-invasive manner, while said services of the trusted domain OS are operated by an external entity at the network by means of said packets, respectively, while entirely avoiding any interaction between the packets that carry operation instructions or service results respectively, and the main OS.

In an embodiment of the invention, the trusted domain OS comprises a check-alive service for periodically or upon receipt of an external trigger, checks that the main OS is alive, namely that it is not in a halt state.

In an embodiment of the invention, the trusted domain OS comprises an introspection process list service which extracts a list of currently running services from the main OS, for further inspection and analysis within the domain of the trusted OS.

In an embodiment of the invention, the trusted domain OS comprises an introspection process memory dump service which halts the main OS, and extracts from the run-time memory that stores the main OS, a section of its memory for further inspection and analysis within the domain of the trusted OS.

In an embodiment of the invention, said inspection and analysis comprises scanning the memory for patterns or signatures relating to malicious code.

In an embodiment of the invention, said trusted domain OS comprises a main domain reboot service that causes reboot of the main OS from within the trusted domain, with no intervention whatsoever of the main OS.

In an embodiment of the invention, said trusted domain OS comprises a main-domain software update service for performing an update procedure of the main OS, wherein said update procedure is performed by said service periodically halting the processor which runs the main OS, replacing sections of contents of the memory which contains the main OS, and rerunning the main OS.

In an embodiment of the invention, the hypervisor comprises a timer for independently triggering processes within one or more of the services of the trusted domain OS.

DETAILED DESCRIPTION OF PREFERRED EMBODIMENTS

Figure 1:
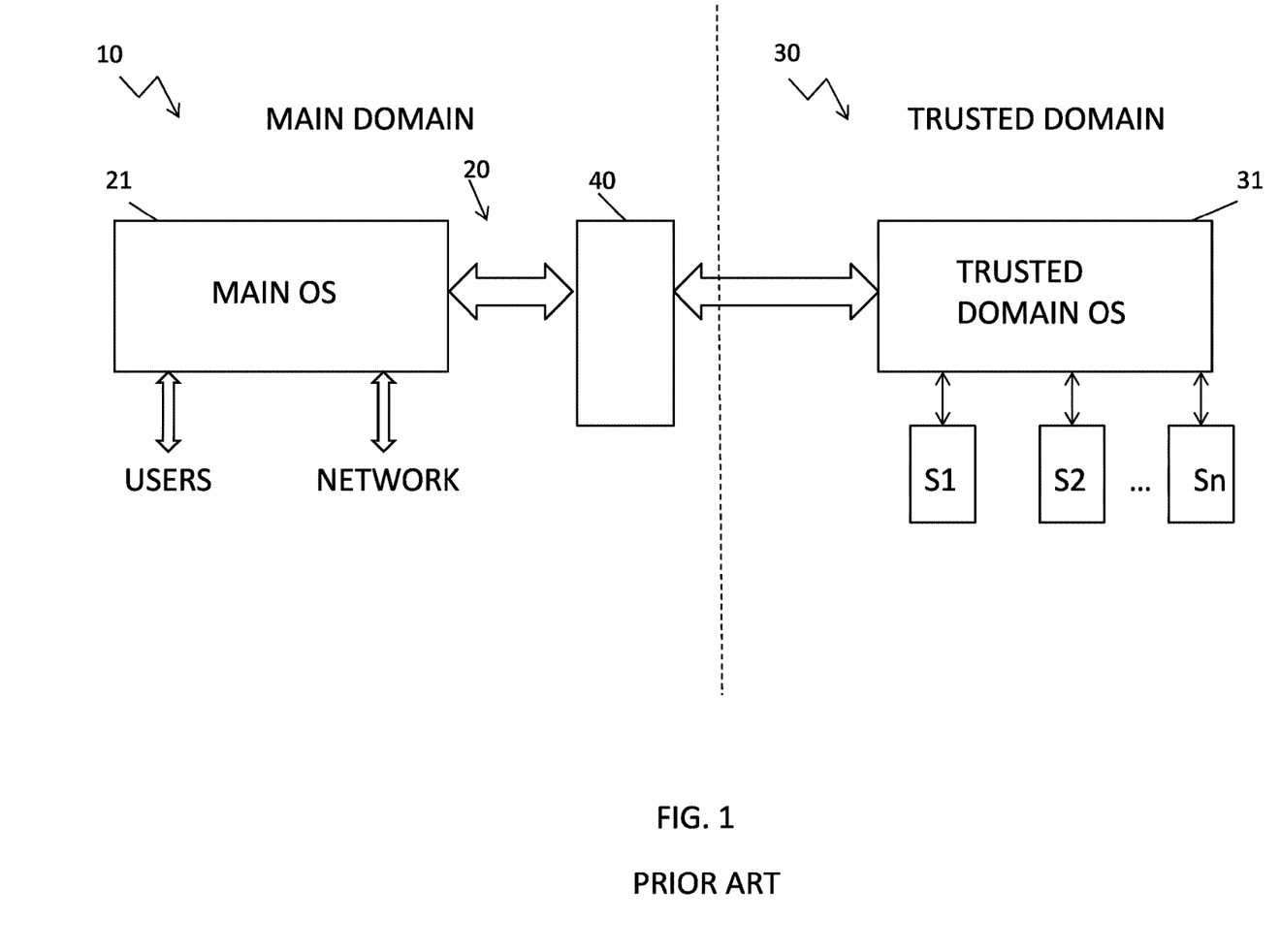
FIG. 1 shows in a general block diagram form a structure of a prior art TEE system having a main domain and a trusted domain.

FIG. 1 illustrates in a block diagram form the general structure of a typical TEE, according to the prior art. As noted, in the TEE structure (such as ARM TrustZone, or Intel TEE) two separate domains of operation are defined: (1) a normal (main) domain 20 of the Main OS 21; and (2) a trusted domain 30 of the Trusted-Domain OS 31. The Trusted Domain OS 31, which comprises one or more services $S_1, S_2, \ldots S_n$, is typically different from the Main OS in structure and language, and is more targets oriented. The interaction between said two operating systems, 20 and 30, respectively, is typically performed via an interface 40 which is susceptible to malicious code, as it resides within the memory domain of the less privileged main OS.

While in offline, a user can define the trusted domain OS 31 only via the main OS 21. Likewise, during runtime, either a user program or a network packet may interact with the trusted domain OS 31 only via the Main OS 21 (and interface 40).

Figure 2:
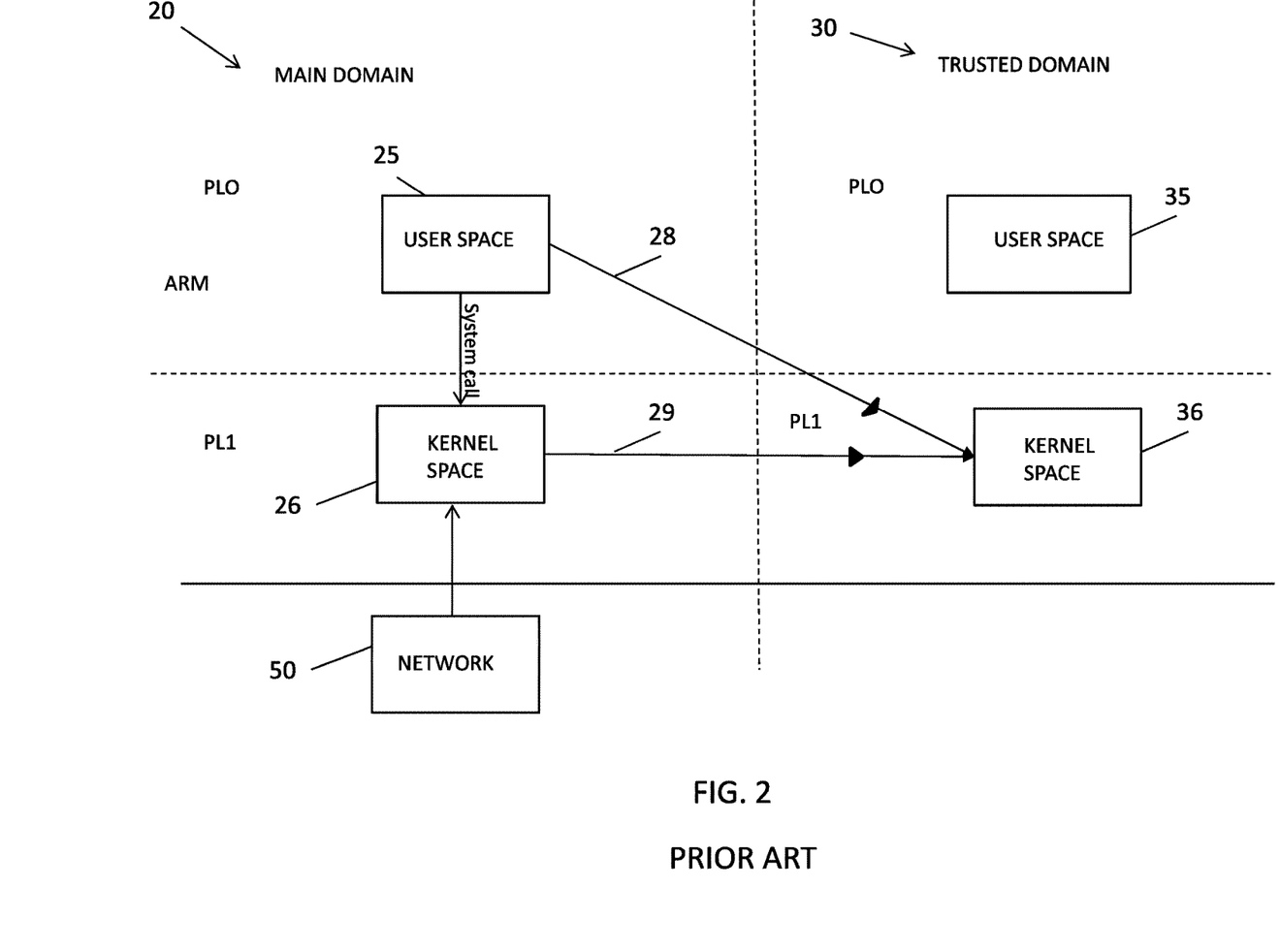
FIG. 2 shows in a general block diagram form still another structure of a conventional prior art TEE system having a main domain and a trusted domain.

FIG. 2 shows in a general block diagram form still another structure of a conventional prior art TEE system having a main domain 20 and a trusted domain 30. As noted, the main OS resides in the main domain 20, while the trusted domain OS resides in the trusted domain 30. As is conventional, each of said operating systems is divided into a user space section (25 and 35 respectively) residing in a less privileged level PL0, and a kernel space section (26 and 36 respectively) residing in a more privileged level PL1. The trusted domain 30 provides highly secured services to the main domain 20, for example, encryption/decryption services, keys storing, integrity checks, etc. The main domain typically communicates with the secured (trusted) domain via a dedicated API (not shown). The main domain 20 conveys to the trusted domain 30 requests for services. The requests 28 and 29 are issued either from the user space 25, or from the kernel space 26 of the main domain 20. The processor transfers the control to the trusted domain 30, which in turn processes the request and returns the results and control to the main domain 20.

A request for a trusted domain service may result, for example, from a network packet 50, or a user space program (not shown) which causes issuance of a system call to the kernel space 26.

The prior art architecture of FIGS. 1 and 2, which requires submission of requests to the secured domain via the main domain has several drawbacks in term of security. First, the operating system 20 at the main domain can be compromised, for example, by the injection of malicious code. When the main operating system 21 (FIG. 1) which resides in the main domain 20 is compromised, an adversary may exploite this compromise to manipulate all the requests that pass through the main OS. For example, when a valid request is conveyed to the main domain 20 (for example, from a network packet) to initiate a call to the secured domain 30, a malicious code at the main OS may intercept the request, abort the call to the trusted domain 30, and return its own faked response. In another example, a malicious code at the main domain 20 may perform a denial of service (DoS) attack on the trusted domain to entirely prevent receipt of request calls at the trusted domain.

The present invention provides a structure that eliminates a possible exploitation of the trusted domain 30 by maliciously affecting the main OS at the main domain 20.

Figure 3:
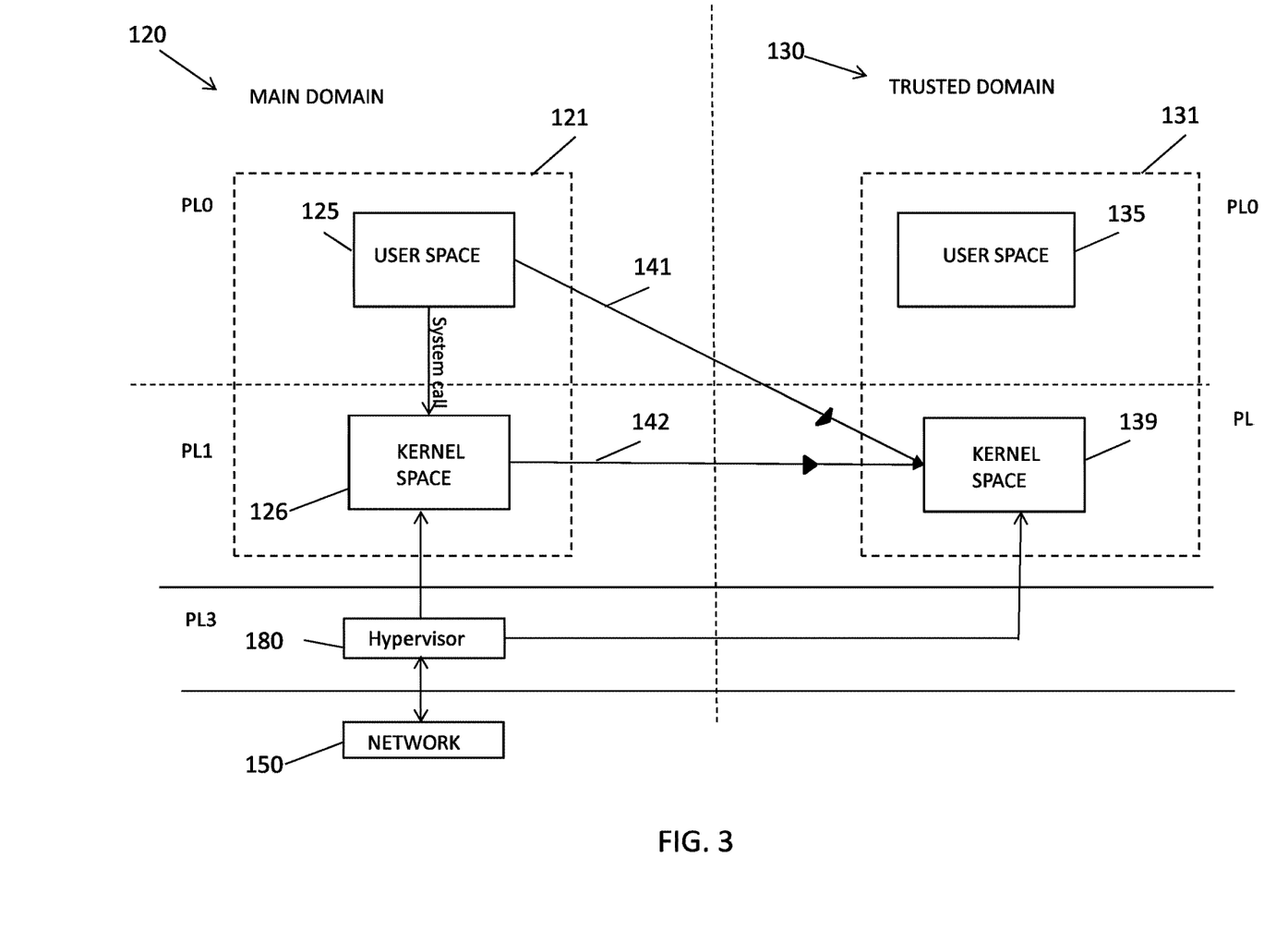
FIG. 3 shows in a general block diagram form a novel structure for performing secured operations within the trusted domain 130 of the processor, according to the present invention.

FIG. 3 shows in a general block diagram form a novel structure for performing secured operations within the trusted domain 130 of the processor, according to the present invention. Components having indices similar to those of FIG. 2 perform substantially a same function. According to the present invention, the system further comprises a highly privileged low level "hypervisor" 180 (at a privileged level PL3), which is used to route packets that arrive from the network 150 either to the main OS 121 or to the trusted domain OS 131. More specifically, those packets arriving hypervisor 180 that are targeted to the trusted domain OS 131 are conveyed directly to the trusted domain OS 131, while avoiding any passage through or interaction with both the main OS 121 and the high level API (not shown) at the main domain. In one embodiment of the invention, said highly secured direct channel to the trusted domain OS is defined as the only possible channel to the trusted domain 130 (while eliminating entirely the channels 141 and 142 from the main OS to the trusted domain OS). Moreover, processing results from the trusted operating system which operates at the trusted domain 131 are conveyed back to the issuing entity in the network 150 via the hypervisor 180, while entirely avoiding any interaction with the main operating system.

In another embodiment of the invention, although less preferable, said highly secured channel is provided in addition to the conventional channels, 141 and 142 respectively, from the user space 125 and from the kernel space 126 of the main OS 121 to the kernel space 139 of the trusted domain OS 131. More specifically, in said latter embodiment the user may still use said two conventional channels 141 and 142 to the trusted domain, while being aware that said conventional channels may be compromised.

In an embodiment of the invention, packets from network 150 that are targeted to the trusted domain OS 131 are differentiated from packets that are targeted to the main OS 121 by their MAC address. The hypervisor 180, in turn, inspects the header of each arriving packet, and accordingly directs the packet either to the main OS 121, or directly to the trusted domain OS 131 based on the MAC address. This manner of differentiation between the packets is very simple and efficient, therefore the routing of the packets respectively can be performed by hypervisor 150 in a very fast manner.

In an embodiment of the invention, the trusted operating system 131 may comprise a variety of services, such as: maintenance services, introspection services, debugging and memory-acquisition services, integrity check services, and security and cyber-defense services. As described above, all said services of the trusted domain OS 131 operate in a way which is entirely independent from the main OS 121, as the interaction between an external entity and the trusted domain OS 131 is performed directly, by means of packets passing via the hypervisor, and avoiding any interaction whatsoever with the main OS 121 (i.e., without changing or modifying the main OS memory or execution-flow). Therefore, this structure and manner of operation is much safer compared to the prior art.

EXAMPLES

As noted, the trusted OS runs alongside the main OS in the TEE, and performs operations on the main OS in a non-invasive way. For example, the trusted operating system services may perform the following non-invasive operations on the main OS:

General Services:
1. The services of the trusted domain OS may be triggered if one the following events occurs:
    Timer triggered, periodic (for example, every 1000 ms);
    Timer triggered—setup timer;
    Hardware event triggered (for example, interrupts);
    Network command triggered;
2. In another example, the trusted domain OS 131 may perform an integrity analysis of the main OS 121, by periodically halting the main OS 121, performing memory acquisition, and scanning and inspecting the extracted memory section for a possible existence of malicious code. As said, this is done while avoiding any interaction or dependence on the main OS 121.

Maintenance Services:
3. The services of the trusted domain OS 131 may perform "heartbeat" checks on the main OS 121, for example, checking the processor and its core activities to determine whether the main OS 121 is fully functioning;
4. The services of the trusted domain OS 131 a system-load monitoring of the main OS, and sampling of the processor loads and processor counters;
5. The services of the trusted domain OS 131 may check the memory usage of the main OS 121, for example, by checking the free and allocated memory tables;
6. The services of the trusted domain OS 131 may check for exceptions and interrupts that may occur in the main OS 121, for example, monitoring of hardware interrupts and exceptions.
7. The services of the trusted domain OS 131 may halt the main OS, for example, by halting the processors or the cores by an appropriate request;
8. The services of the trusted domain OS 131 may initiate a shutdown process of the main OS 121, for example, by triggering a shutdown interrupt of the main OS 121.

Introspection Services:
9. The services of the trusted domain OS 131 may extract a process/thread list of the main OS 121, namely, it may perform introspective analysis of the main memory and extract the process and thread list;
10. The services of the trusted domain OS 131 may check for network activity reports, namely, it may report the current open TCP/IP ports as reflected in the main OS handles;
11. The services of the trusted domain OS 131 may reconstruct and parse various kernel objects of the main OS 121;
12. The services of the trusted domain OS 131 may open file handle lists to reconstructing and parse various handle list tables;
13. The services of the trusted domain OS 131 may extract memory and object allocation tables or other kernel elements for reconstruction of them.

Debugging and Memory Acquisition Services:
14. The services of the trusted domain OS 131 may extract system and kernel memory by range;
15. The services of the trusted domain OS 131 may perform system debugging and trace at various levels;
16. The services of the trusted domain OS 131 may perform kernel panic monitoring;
17. The services of the trusted domain OS 131 may extract system logs;
18. The services of the trusted domain OS 131 may issue critical alerts;
19. The services of the trusted domain OS 131 may extract memory content in a case of failure for offline analysis;
20. The services of the trusted domain OS 131 may analyze and detect memory corruptions;

Integrity-Check Services:
21. The services of the trusted domain OS 131 may validate in-memory kernel integrity of the main OS 121, namely, a validation of the kernel integrity on load and other invariant parts after the load;
22. The services of the trusted domain OS 131 may validate perform in-memory driver integrity check of the main OS 121, namely validation of drivers integrity, and on-load and after-load signatures;
23. The services of the trusted domain OS 131 may validate in-memory application/process integrity;
24. The services of the trusted domain OS 131 may file system integrity check in a persistent storage.

Security and Cyber-Defense Integrity;

25. The services of the trusted domain OS 131 may perform implement a trusted firewall outside of the main OS 121;
26. The services of the trusted domain OS 131 may also perform trusted packet and I/O encryption and decryption for entities external of the main OS;
27. The services of the trusted domain OS 131 may also perform a trusted signing mechanism, namely, it may sign packets outside of the main OS 121;
28. The services of the trusted domain OS 131 may also perform a trusted memory scanning, namely, it may scan the memory for malicious signature, vulnerabilities and corruptions.

Figure 4:
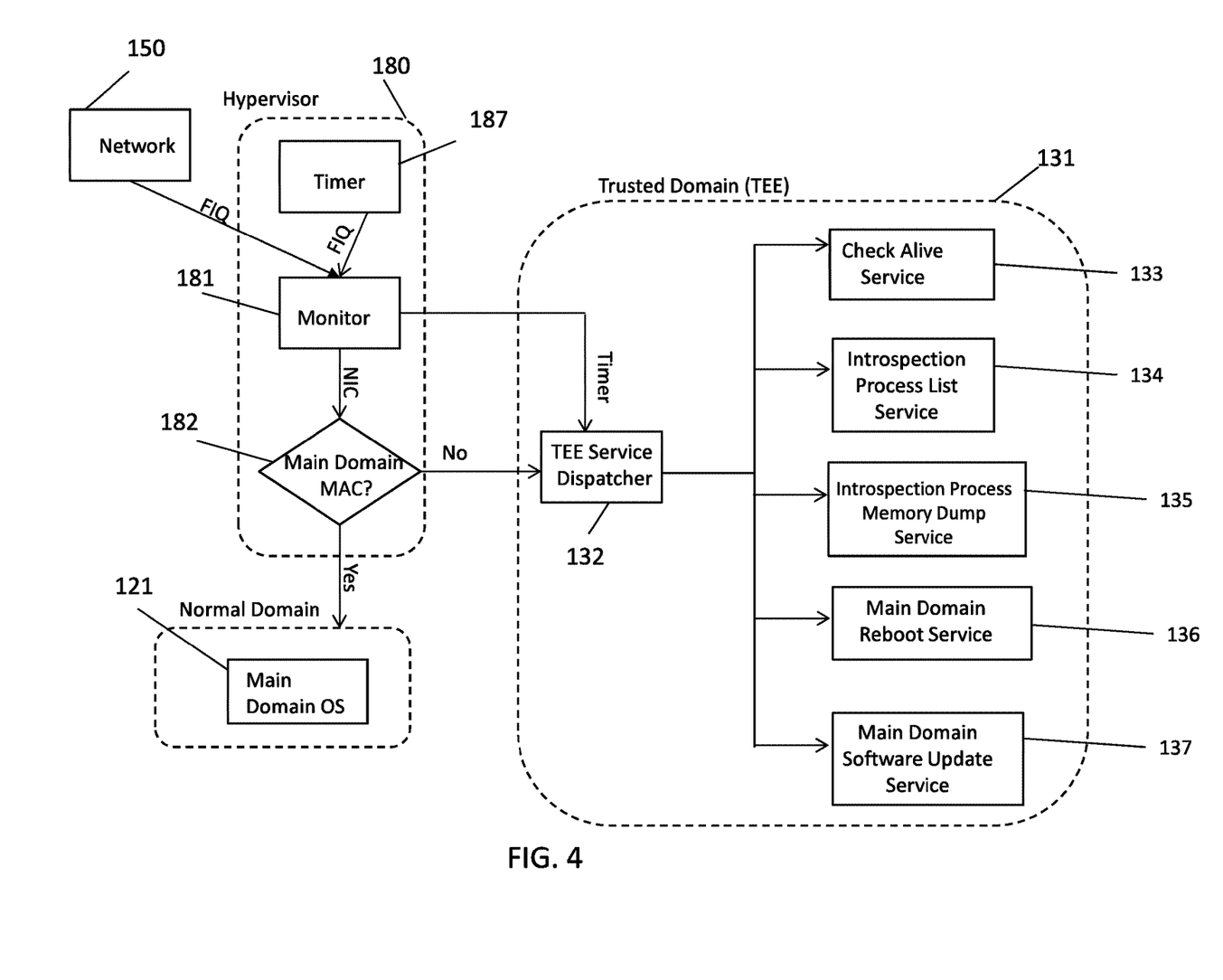
FIG. 4 shows in a general block diagram form still another example of a structure of a TEE system according to an embodiment of the present invention.

FIG. 4 shows still another example of a structure of a TEE system according to an embodiment of the present invention. Monitor 181 within hypervisor 180 may receive an FIQ interrupt from either an entity in the network 150 (in a form of a packet—as described above) or from an internal timer 187. If the interrupt comes from the network, the packet is conveyed to a routing unit 182. The routing unit inspects the MAC address of the packet. If the MAC address relates to the main OS 121, the packet is forwarded to the main OS. Otherwise, when the MAC address relates to the TEE, the packet is forwarded to the TEE service dispatcher 132 within the secured domain 131. The TEE service dispatcher may then activate one or more of the exemplary services 133, 134, 135, 136, or 137, respectively.

The Check Alive service 133 checks various elements of the main OS to ensure that it is not halted (i.e., that the OS is indeed running).

The Introspection Process List service 134 extracts the list of currently running services from the main OS 121, for further inspection and analysis within the trusted OS 121 domain.

The Introspection Process Memory Dump service 135 halts the main OS 121, and extracts from the main OS 121 a section of its memory, for further inspection and analysis within the trusted OS 121 domain.

The Main Domain Reboot service 136 performs reboot of the main OS 121 upon a specific event or trigger.

Finally, the Main Domain Software Update service 137 performs an updating procedure of the main OS 121. This procedure is performed by periodical halting the processor which runs the main OS, replacing sections of the memory, and rerunning the main OS.

It should be noted that all said services are unique, as they may be activated from an external entity (via the hypervisor), they are operated from within trusted domain OS, and the results may be conveyed back directly to the activating entity via the hypervisor, without any intervention whatsoever of the main OS.

Alternatively, if the FIQ relates to a timer 187 issued interrupt, the interrupt is conveyed from the monitor to the TEE service dispatcher, which in turn activates one of the services, 132-137, respectively.

As a result of this structure, the secured services 133-137 may be triggered by one the following events:

1. Periodic timer 187 trigger—A secured service begins execution every given period of time. The wakeup is managed via timer 187 interrupts. Example for a service which is activated is the check alive service 133 which checks every 10 seconds that the operating system is alive (i.e., that it is not halted);
2. Timer triggered, setup timer—A secured service begins execution of some procedure a predetermined time after the occurrence of a predefined event;
3. Hardware event trigger—The secured service begins execution upon a hardware event as determined by the secured OS 131. This may occur, for example, when an I/O operation begins or is completed, or upon arrival or sending of a network packet;
4. Network command triggered—The secured service begins execution when a command from the network 150 is received within a packet from the routing unit 182.

The above types of events are managed in the internal queues of the trusted OS 131, and are mapped to the appropriate services.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A processing device configured with a (Trusted Environment Execution (TEE) structure, said processing device comprising:
   a non-volatile memory having a plurality of sections, wherein:
      a. a first section of said plurality of sections is stored with a main domain defining a domain of operation for a main operating system (OS);
      b. a second section of said plurality of sections is stored with a privileged trusted domain defining a domain of operation for a trusted domain OS; and
      c. a third section of said plurality of sections with a low level hypervisor which is separate from both of said main OS and said trusted domain OS, said low level hypervisor being operable for:
         (i) receiving packets from a network;
         (ii) examining an address included in each of said received packets; and
         (iii) based on the examined address in each of said packets, targeting the packet to either said main OS or to said trusted domain OS; and
   a secured channel extending between said low level hypervisor and said trusted domain OS which constitutes an only possible channel to said trusted domain, wherein said low level hypervisor is operable to directly convey packets received from an external entity over said secured channel to said trusted domain OS while avoiding any interaction whatsoever with said main OS.

2. The processing device according to claim 1, wherein said received packets that are targeted to the trusted domain OS convey information to one or more services running by said trusted domain OS at said trusted domain, and wherein results obtained by said one or more running services are conveyed in a packet form back to the low level hypervisor, the low level hypervisor being operable to route the packet to the external entity at the network, without any interaction with said main OS.

3. The processing device according to claim 1, wherein said examination by the low level hypervisor of the packet address is performed on a MAC address as defined in a header within said packet.

4. The processing device according to claim 2, wherein said one or more services of the trusted domain OS analyze data relating to the main OS in a non-invasive manner, while said one or more services of the trusted domain OS are operated by the external entity at the network by means of said packets, respectively, while entirely avoiding any interaction between the packets that carry operation instructions or service results respectively, and the main OS.

5. The processing device according to claim 2, wherein the trusted domain OS comprises a check-alive service for periodically or upon receipt of an external trigger, checks that the main OS is alive, namely that it is not in a halt state.

6. The processing device according to claim 2, wherein the trusted domain OS comprises an introspection process list service which extracts a list of currently running services from the main OS, for further inspection and analysis within the domain of the trusted OS.

7. The processing device according to claim 2, wherein the trusted domain OS comprises an introspection process memory dump service which halts the main OS, and extracts from the run-time memory that stores the main OS, a section of its memory for further inspection and analysis within the domain of the trusted OS.

8. The processing device according to claim 7, wherein said inspection and analysis comprises scanning the memory for patterns or signatures relating to malicious code.

9. The processing device according to claim 2, wherein said trusted domain OS comprises a main domain reboot service that causes reboot of the main OS from within the trusted domain, with no intervention whatsoever of the main OS.

10. The processing device according to claim 2, wherein said trusted domain OS comprises a main-domain software update service for performing an update procedure of the main OS, wherein said update procedure is performed by said service periodically halting the processor which runs the main OS, replacing sections of contents of the memory which contains the main OS, and rerunning the main OS.

11. The processing device according to claim 1, wherein the low level hypervisor comprises a timer for independently triggering processes within one or more of the services of the trusted domain OS.

* * * * *

UNITED STATES PATENT AND TRADEMARK OFFICE
CERTIFICATE OF CORRECTION

| | |
|---|---|
| PATENT NO. | : 10,742,603 B2 |
| APPLICATION NO. | : 15/755073 |
| DATED | : August 11, 2020 |
| INVENTOR(S) | : Guri et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 143 days.

Signed and Sealed this
Seventh Day of February, 2023

Katherine Kelly Vidal
*Director of the United States Patent and Trademark Office*